United States Patent [19]

Wanner et al.

[11] 4,368,556

[45] Jan. 18, 1983

[54] HANDLE ASSEMBLY

[75] Inventors: Karl Wanner; Herbert Wiesner, both of Leinfelden-Echterdingen; Rolf Renner, Stuttgart-Plieningen, all of Fed. Rep. of Germany

[73] Assignee: Robert Bosch GmbH, Stuttgart, Fed. Rep. of Germany

[21] Appl. No.: 230,588

[22] Filed: Feb. 2, 1981

[30] Foreign Application Priority Data

Mar. 14, 1980 [DE] Fed. Rep. of Germany ... 8006965[U]

[51] Int. Cl.³ .......................... E05B 3/00; E21B 11/00
[52] U.S. Cl. ............................... 16/111 R; 51/170 R; 173/162 H
[58] Field of Search .............. 16/110 R, 110 A, 110.5, 16/111 R, 119, DIG. 24, DIG. 25, 114 R, 114 A, DIG. 12; 408/241 S; 173/170; 30/296 R, 297, 298; 7/167, 168; 81/428, 428 PG, 177 A, 53 R

[56] References Cited

U.S. PATENT DOCUMENTS

| 1,928,082 | 9/1933 | Vigne | 16/110 R |
| 2,545,659 | 3/1951 | Ginter | 16/110 R |
| 3,537,336 | 11/1970 | Schmuck | 408/241 S |
| 4,207,953 | 6/1980 | Reibetanz et al. | 173/163 X |

Primary Examiner—Paul A. Bell
Assistant Examiner—John S. Brown
Attorney, Agent, or Firm—Michael J. Striker

[57] ABSTRACT

A handle-connecting assemby for hand-held machine tools comprises a wire element having a loop engaging a tool-supporting projection of the tool and a hollow member adapted to receive the ends of the wire element. The ends of the wire element are rigidly connected to a head of a bolt, the end threaded portion of which is threaded into a handle. The wire element connecting the tool-supporting projection to the handle provides for sufficient flexibility of such connection thereby the handle may positioned at an acute angle to the axis of elongation of the projection.

16 Claims, 8 Drawing Figures

HANDLE ASSEMBLY

BACKGROUND OF THE INVENTION

This invention generally relates to hand-held machine tools, and more particularly to assembling means for mounting a handle on a housing of the tool.

In the known handle assemblies utilized in hand-held machine tools a flat strip-like band has been used to mount a handle on a tool-supporting part of the tool housing. This band adapted to engage the tool-supporting part has been placed in a slot formed on a head of a bolt threadably connected to the handle. The band was supported in said slot by a mounting pin placed into a bore formed in said bolt head and extending normal to the slot. In assembly the pin has been limited by inner surfaces of a hollow connecting member adapted to support the bolt and thereby prevented from falling out from the bore. In such assembly the head of the bolt abuts against the inner surfaces of the hollow connecting member so that the bore with the pin inserted therein is closed by said inner surfaces.

This otherwise satisfactory handle assembly has, however, a disadvantage which substantially limits its use. This disadvantage is that due to the flat shape of the strip-like band only the right-angled position of the handle relative to the longitudinal axis of the tool-supporting part of the tool is possible. The position of the handle at an angle less than 90° to the axis of the tool support has been found very convenient for an operator. However, the strip-like shape of the loop connecting the tool support to the handle prevents such disposition of the handle since such loop can not be deflected without damaging the band.

Another disadvantage of the prior art device is that the mounting pin used in the known assembly may easily fall out from the bore and get lost during dismantling of the assembly. It should be also noted that the utilization of the flat band which is rather inflexible makes it difficult to adjust such band for various diameters and cross-sections of tool-supporting parts of the hand-held machine tools. The clamping of the handle on the tool support is also rather difficult since the relatively unflexible flat band prevents the proper deflection of transition portions of the band which are located between the band loop and the end portions of the band connected to the handle.

SUMMARY OF THE INVENTION

It is an object of the invention to provide a handle assembly which avoids by simple means the aforementioned shortcomings encountered in the prior art.

Another object of the invention is to provide an improved handle assembly where individual elements can be hardly lost during dismounting of the assembly.

Still another object of the invention is to provide an improved handle assembly which is easy to assemble and reliable in operation.

These and other objects of the invention are attained by a handle assembly for a hand-held machine tool having a housing and a cylindrical projection extending from said housing and adapted to receive a tool, and a handle having an opening, comprising means for connecting said handle to said housing, said means including at least one clamping strand formed with a loop, two end portions and two transition shoulders located between said loop and said end portions, said loop being adapted to encompass said projection; a hollow member positioned between said projection and said handle and adapted to receive said transition shoulders and said end portions, and a bolt having one end rigidly connected to said end portions and another end threadably inserted into said opening of the handle, said clamping strand being formed as a wire element.

The utilization of the wire element having a greater elasticity results in an effective absorption and dampening of vibrations occured during operation of drills or hammers.

The use of the wire element in the handle assembly provides a satisfactory clamping of the handle on the tool support whereby safe working conditions for an operator may be achieved.

The handle disassembled from the tool support may be easily mounted on the support again by mere rotation of the handle and its installation into the proper position on the support.

The wire element has been found more appropriate for adjusting on the tool supports of various diameters and cross-sections.

The hollow member of the assembly may have a longitudinal axis, said bolt extending within said member substantially parallel to said axis.

The transition shoulders may extend substantially parallel to the direction of elongation of said projection.

The bolt may include a head facing away from said opening, said end portions being rigidly connected to said head.

The head may be formed with two bores adapted to receive said end portions of said wire element.

The assembly may further include two hollow sleeves adapted to receive the ends of said end portions and rigidly connected to said head. These sleeves may be pressed to the head of the bolt.

The assembly may further include a bushing extended from said head and positioned within said hollow member, said bushing having two openings for receiving said end portion of said wire element, at least one of said end portions being pressed and plastically deformed in the corresponding opening to connect said wire element to said head.

The assembly may comprise two clamping strands having two loops, respectively, said loops being wound about said projection. The connecting means may include a hook positioned between the corresponding end portions of said two strands and adapted to clamp said end portions on said head.

The wire element may include two loops wound about said projection.

The hollow member may be formed with a cylindrical bearing surface adapted to engage said transition shoulders in assembly, said bearing surface corresponding to the outer periphery of said projection.

The projection may be formed with a guiding groove on the outer periphery of said projection, said groove being adapted to receive said loop. This groove may be circumferential or helical.

The handle may be positioned at an acute angle to the direction of elongation of said projection. The utilization of the wire element assures such angular disposition of the handle due to linear contact of the wire with the surface of the projection.

By provision of the groove on the projection the wire element may reliably engage said projection whereby the well-defined axial fixation of the handle on the tool support of a hand-held machine tool may be obtained.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE PREFERRED EMBODIMENTS

Figure 1:
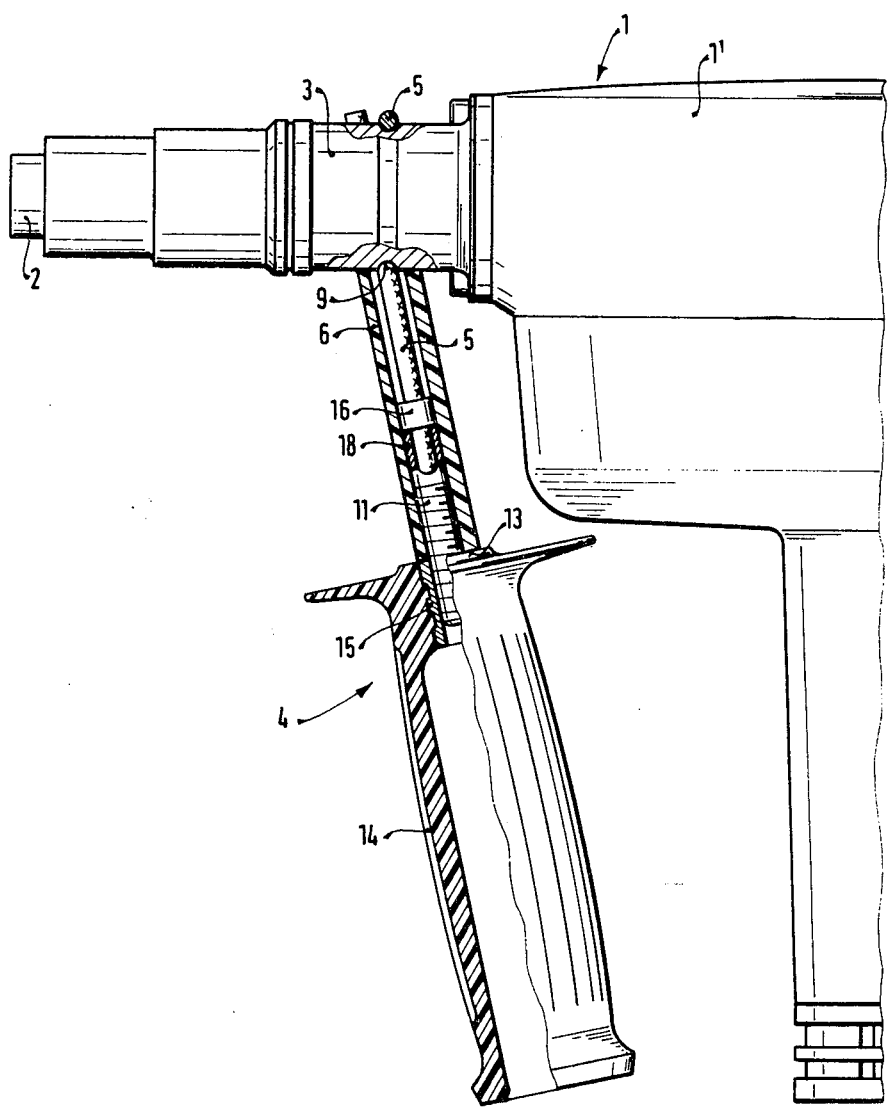
FIG. 1 is a partial elevational view of a drill hammer with a handle assembly, partially in section, in accordance with the invention.

FIG. 1 illustrates a partial elevational view of a hammer drill 1 with a handle 4. The drill 1 is formed with a cylindrical extension 3 projecting axially outwardly from the housing 1' of the drill which supports a spindle of the tool not illustrated herein. The extension 3 is terminated with a tool support 2 adapted to hold a tool, for example a drill also not illustrated in the drawing. The handle 4 is connected to the extension 3 by means which will be explained in detail below.

Figure 2:
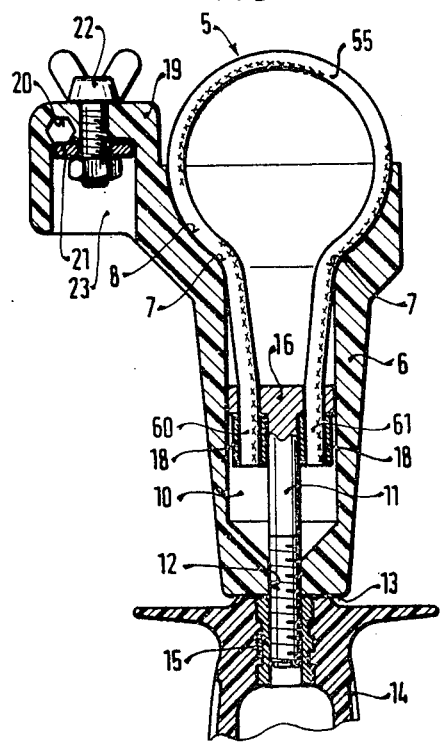
FIG. 2 is a sectional axial view through the handle assembly of the first embodiment of the invention.

A handle-connecting assembly includes a hollow member 6 also illustrated in FIG. 2 in a larger scale. A clamping element in form of a steel strand or wire 5 of a substantially circular cross-section is mounted on the extension 3 so that this wire surrounds extension 3 on a groove 9 provided on the extension forming a loop 55 which is terminated with two end portions 60, 61 received in the interior 10 of the hollow member 6. The member 6 is formed with a substantially cylindrical bearing surface 8 which supports deflected transition shoulders 7 formed in the wire element between the loop 55 and the end portions 60, 61. In assembly, the bearing surface 8 engages the shoulders 7 whose shape corresponds to the shape of the surface 8. The longitudinal axis of the cylindrical bearing surface 8 obviously coincides with the longitudinal axis of the extension 3. It is to be understood, however, that the longitudinal axis of the handle 4 extends at an acute angle to the axis of the extension 3.

The loop 55 of wire 5 engages the groove 9 provided on the circumference of the extension 3. In the embodiment shown in FIG. 2 the groove 9 has a circumferential shape.

The end portions 60 and 61 extend through openings 17 formed in a head 16 of a connecting bolt 11. This bolt is located in the interior 10 of the member 6 and extends substantially parallel to the longitudinal axis thereof. The bolt 11 is provided with the aforementioned head 16 to receive the ends of the wire element and a guiding threaded portion which extends through a guiding opening 12 formed in the bottom part of the member 6.

The member 6 carrying the wire element 5 and the bolt 11 is attached to a handle 14 by the face 13 and thereafter bolt 11 is threaded to a sleeve 15 rigidly mounted in the handle 14. The hollow handle 14 is made of plastic synthetic material, and the sleeve 15 with an internal thread may be pressed therein.

Figure 3:
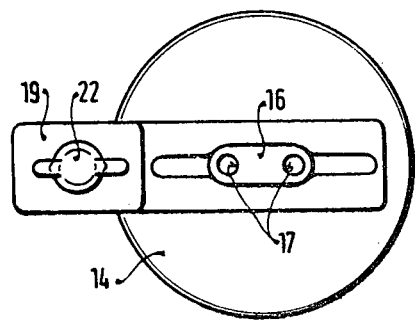
FIG. 3 is a plan view of the assembly shown in FIG. 2.

The head 16 which may have a yoke-shaped configuration, as can be clearly seen in FIG. 3, is provided with two steel sleeves or nipples 18 which are pressed to the bottom surface of the head 16 and adapted to receive the ends of portions 60 and 61, respectively. The subassembly including the wire 5, bolt 11 and sleeves 18 is assembled preliminary to the mounting of the loop 55 on the extension 3. Thereafter the subassembly is inserted into the hollow member 6 and threaded by bolt 11 to the handle 14.

The hollow member 6 illustrated in FIG. 2 has a laterally extended bent projection 19. This projection is formed with a bore 20 extending substantially parallel to the longitudinal axis of the extension 3. The bore 2 has a profiled shape and adapted to receive a profiled pin which serves as a limit stop or a depth-defining means for a drill.

A recess 23 is formed in the projection 19, which recess extends normal to the bore 20. A clamping plate 21 is mounted within the recess 23 and clamped to the projection 19 by a clamping bolt 22 after the profiled pin has been inserted into the bore 20.

In assembling, the bolt 11 extends into sleeve 15 in the handle 14 unless the loop 55 of the steel wire 5 easily slides over the extension 3 and tightly engages the groove 9 thereon. The necessary tension required for the safe connection of the handle on the drill housing is provided by an operator who advances the bolt 11 into the handle 14 at the necessary distance.

Figure 4:
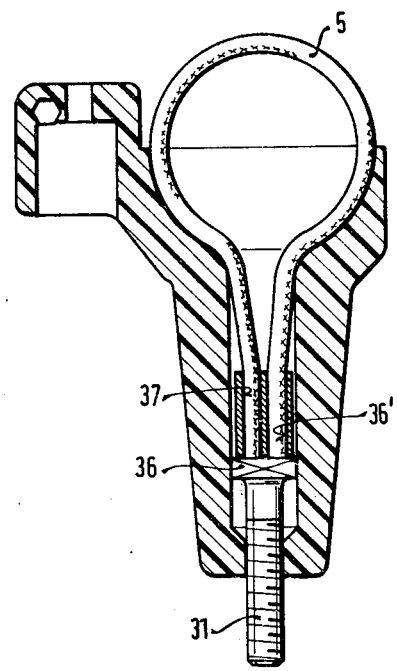
FIG. 4 shows in section another embodiment of the handle assembly according to the invention.

FIG. 4 depicts another embodiment of the invention where a bolt 31 is formed with a head 36. In this embodiment a bushing 36' is positioned above the head 36 and has a pair of bores 37 for receiving the respective end portions of the steel wire. The end portions of wire 5 together with the bushing 36' are pressed to the head 36 so that the connected parts are plastically deformed. The subassembly obtained by such pressing is mounted on the extension 3 in the manner similar to that described for FIG. 2.

Figure 5:
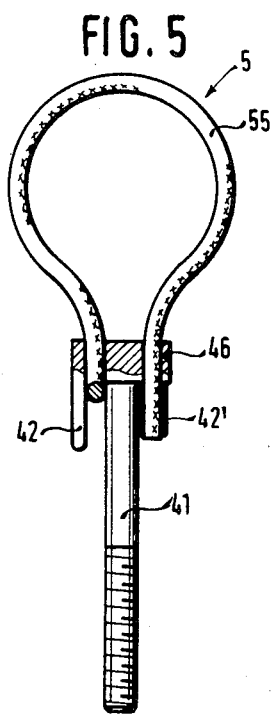
FIG. 5 is a partial sectional view of still another embodiment of the assembly.
Figure 6:
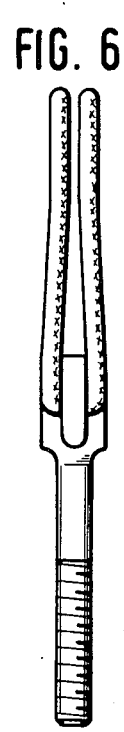
FIG. 6 is a side view of the assembly shown in FIG. 5.

FIGS. 5 and 6 illustrate the embodiment where two wire elements 5 with the respective two loops are mounted on the extension 3. The ends of the wires are connected to the head 46 of the bolt 41 by a hook 42 placed between the ends of the two neighboring loops and clamping them on the bolt 41. The ends of the wires may also be connected to the head 46 by a sleeve 42' pressed to the head 46 in the mode described for sleeves or nipples 18 illustrated in FIG. 2. The ends of the wires may be assembled on the head 46 by either of the two above-described steps.

Figure 7:
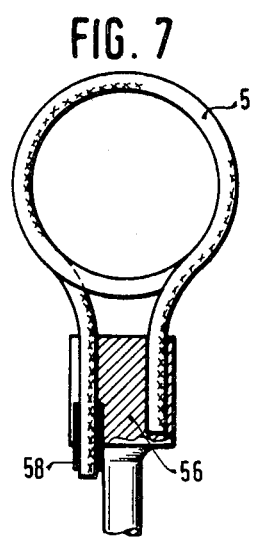
FIGS. 7 and 8 are axial and side views of yet another embodiments of the invention.
Figure 8:
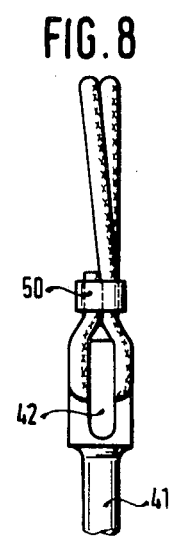

FIGS. 7 and 8 show an embodiment in which one wire element 5 engages the extension 3 by two loops whereby the element 5 is wound about the groove 9 which may be helical. In FIG. 7 one of the end portions of the wire 5 is pressed to the head 56 by means of a nipple 58 partially received in the head 56 whereas the other end portion is merely pressed within the head 56.

FIG. 8 shows a connection of the wire 5 to the bolt 41 by the hook 42 mounted on the head of the bolt in the manner similar to that described for FIGS. 5 and 6.

It will be understood that each of the elements described above, or two or more together, may also find a useful application in other types of handle assembly differing from the types described above.

While the invention has been illustrated and described as embodied in a handle assembly, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A handle assembly for a hand-held machine tool having a housing and a cylindrical projection extending from said housing and adapted to receive a tool, and a handle having an opening, comprising means for connecting said handle to said housing, said means including at least one clamping strand formed with a loop, two end portions and two transition shoulders located between said loop and said end portions, said loop being adapted to encompass said projection; a hollow member positioned between said projection and said handle and adapted to receive said transition shoulders and said end portions; and a bolt having one end rigidly connected to said end portions and another end threadably inserted into said opening of the handle, said clamping strand being formed as a wire element.

2. The assembly of claim 1, wherein said member has a longitudinal axis, said bolt extending within said member substantially parallel to said axis.

3. The assembly of claim 2, wherein said transition shoulders extend substantially parallel to the direction of elongation of said projection.

4. The assembly of claim 3, wherein said bolt including a head facing away from said opening, said end portions being rigidly connected to said head.

5. The assembly of claim 4, wherein said head is formed with two bores adapted to receive said end portions of said wire element.

6. The assembly of claim 5, further including two hollow sleeves adapted to receive the ends of said end portions and rigidly connected to said head.

7. The assembly of claim 6, wherein said sleeves and said ends are pressed to said head.

8. The assembly of claim 4, further including a bushing upwardly extended from said head and positioned within said hollow member, said bushing having two openings for receiving said end portions of said wire element, at least one of said end portions being pressed and plastically deformed in the corresponding opening to connect said wire element to said head.

9. The assembly of claim 4, wherein said connecting means comprise two clamping strands having two loops, respectively, said loops being wound about said projection.

10. The assembly of claim 9, wherein said connecting means include a hook positioned between the corresponding end portions of said two strands and adapted to clamp said end portions on said head.

11. The assembly of claim 4, wherein said wire element includes two loops wound about said projection.

12. The assembly of claim 4, wherein said hollow member is formed with a cylindrical bearing surface adapted to engage said transition shoulders in assembly, said bearing surface corresponding to the outer periphery of said projection.

13. The assembly of claim 12, wherein said projection is formed with a guiding groove on the outer periphery of said projection, said groove being adapted to receive said loop.

14. The assembly of claim 13, wherein said groove is circumferential.

15. The assembly of claim 13, wherein said groove is helical.

16. The assembly of claim 4, wherein said handle is positioned at an acute angle to the direction of elongation of said projection.

* * * * *